United States Patent
Lee et al.

(10) Patent No.: US 12,375,375 B2
(45) Date of Patent: Jul. 29, 2025

(54) LINK DOWN DETECTOR AND LINK DOWN DETECTING METHOD FOR ETHERNET

(71) Applicant: FARADAY TECHNOLOGY CORPORATION, Hsinchu (TW)

(72) Inventors: Po-Hsuan Lee, Hsinchu (TW); I-Chuan Chiu, Hsinchu (TW); Shih-Yi Shih, Hsinchu (TW)

(73) Assignee: FARADAY TECHNOLOGY CORPORATION, Hsinchu (TW)

( * ) Notice: Subject to any disclaimer, the term of this patent is extended or adjusted under 35 U.S.C. 154(b) by 342 days.

(21) Appl. No.: 18/195,961

(22) Filed: May 11, 2023

(65) Prior Publication Data
US 2024/0129213 A1 Apr. 18, 2024

(30) Foreign Application Priority Data
Oct. 14, 2022 (TW) ................. 111139071

(51) Int. Cl.
*H04L 43/0811* (2022.01)
*H04L 43/067* (2022.01)

(52) U.S. Cl.
CPC ........ *H04L 43/0811* (2013.01); *H04L 43/067* (2013.01)

(58) Field of Classification Search
None
See application file for complete search history.

(56) References Cited

U.S. PATENT DOCUMENTS

| | | | |
|---|---|---|---|
| 6,208,637 B1* | 3/2001 | Eames | H04L 12/2801 709/227 |
| 9,203,730 B1 | 12/2015 | Johnson et al. | |
| 2017/0078979 A1* | 3/2017 | Osterling | H04W 52/243 |
| 2020/0186396 A1 | 6/2020 | Fitzgerald et al. | |
| 2024/0323060 A1* | 9/2024 | Cunningham | H04L 12/12 |

FOREIGN PATENT DOCUMENTS

TW 202230339 A 8/2022

OTHER PUBLICATIONS

Office Action issued by Taiwan Intellectual Property Office on Sep. 28, 2023.

* cited by examiner

*Primary Examiner* — Angela Nguyen
(74) *Attorney, Agent, or Firm* — WPAT, PC

(57) ABSTRACT

A link down detector and a link down detecting method for Ethernet are provided. The link down detecting method includes the following steps. Firstly, a received signal is received, and a high-frequency band signal is extracted from the received signal. Consequently, the high-frequency band signal is formed as an extraction signal. Then, a high-frequency band power value of the extraction signal is calculated, and a full band power value of the received signal is calculated. Then, a ratio value of the high-frequency band power value to the full band power value is calculated. In a link up status, if the ratio value is changed dramatically in a specified time, a link down signal is asserted to indicate that a network device connected to the Ethernet is switched to a link down status.

10 Claims, 6 Drawing Sheets

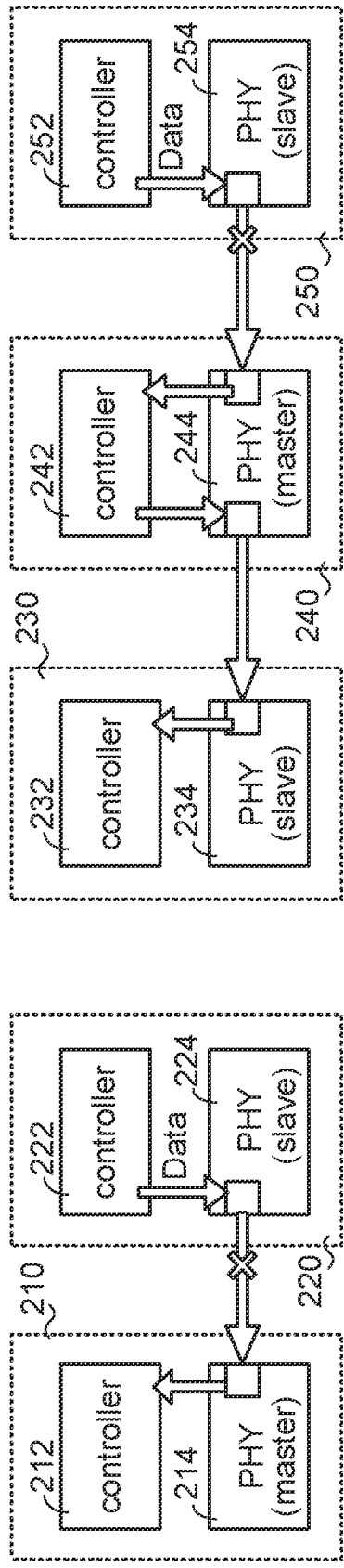
FIG. 2A (PRIOR ART)
FIG. 2B (PRIOR ART)
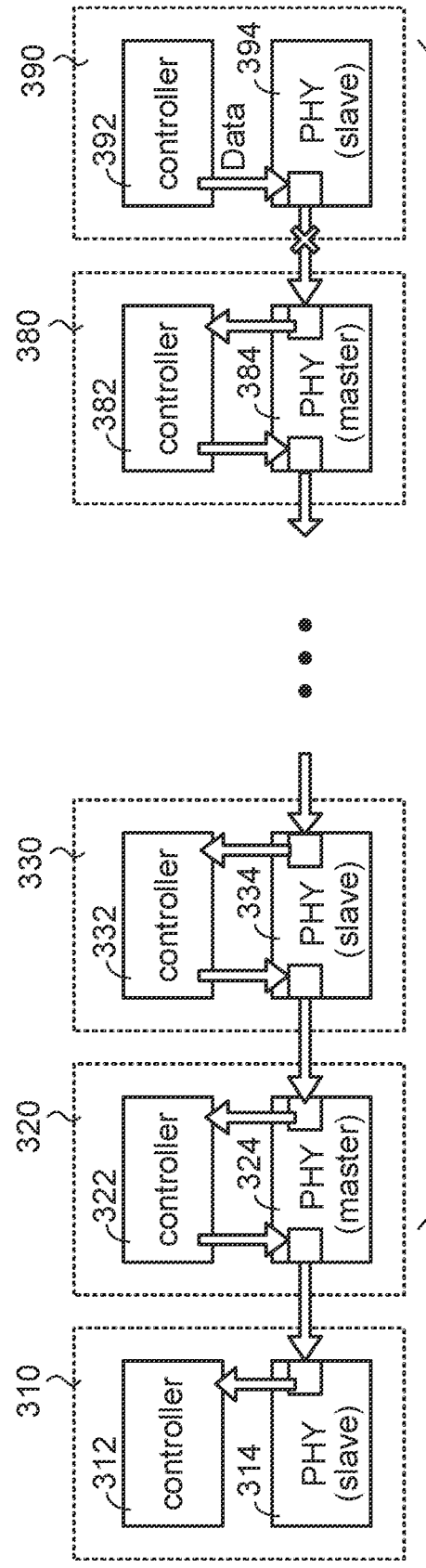
FIG. 2C (PRIOR ART)

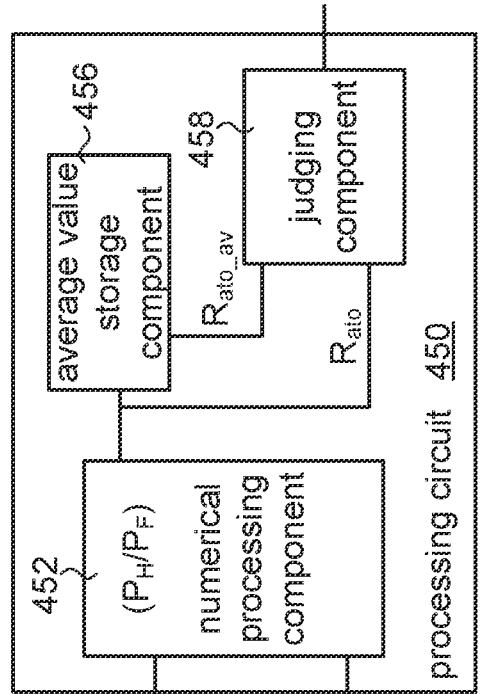
FIG. 3B
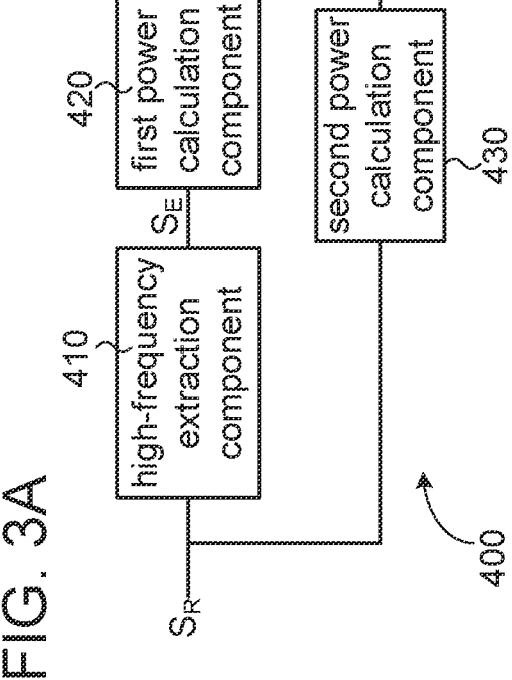
FIG. 4A
FIG. 3A

LINK DOWN DETECTOR AND LINK DOWN DETECTING METHOD FOR ETHERNET

This application claims the benefit of Taiwan Patent Application No. 111139071, filed Oct. 14, 2022, the subject matter of which is incorporated herein by reference.

FIELD OF THE INVENTION

The present invention relates to a link down detector and a link down detecting method, and more particularly to a link down detector and a link down detecting method for Ethernet.

BACKGROUND OF THE INVENTION

Ethernet is one of the technologies widely used in the local area network (also referred as LAN). For example, a 1000Base-T physical layer (1000Base-T PHY) can achieve full duplex baseband transmission on 4 pairs of Category 5 balanced network cables.

Generally, when two network devices are connected with each other through a network cable, the two network devices communicate with each other at first. Consequently, the physical layer (also referred as PHY) of one network device is set as a master, and the physical layer (PHY) of the other network device is set as a slave. In accordance with the IEEE802.3 protocol, there are different specifications for the master and the slave to detect the situation that a link up status (i.e., a connection status) is switched to a link down status (i.e., a disconnection status). The associated specifications will be described as follows in brief.

FIG. 1 is a schematic diagram illustrating a conventional method of judging a link up status and a link down status in a physical layer. After two network devices are connected with each other through a network cable, one of the two network devices is set as a master, and the other of the two network devices is set as a slave. Meanwhile, the network devices enter a link down status (Link Down) along a path I. A link status parameter (Link_status) is used to represent the link down status (Link Down) or the link up status (Link Up). For example, when the link status parameter (Link_status) is FAIL, it means that the network devices enter the link down status (Link Down).

If an equalizer of a receiver (also referred as RX) in the physical layer (PHY) restores the receive signals at a high success rate, a local receiver status parameter (loc_rcvr_status) is "OK". Whereas, if the equalizer of the receiver RX is unable to restore the receive signals, the local receiver status parameter (loc_rcvr_status) is "NOT_OK".

In the link down status (Link Down), if the local receiver status parameter (loc_rcvr_status) is switched to "OK", the network device will enter a hysteresis status (HYSTERESIS).

The hysteresis status (HYSTERESIS) is a temporary status. After the network device enters the hysteresis status (HYSTERESIS), a stabilize timer (stabilize_timer) is started. During the time-counting process of the stabilize timer (stabilize_timer), if the local receiver status parameter (loc_rcvr_status) is switched to "NOT_OK", the network device is jumped back to the link down status (Link DOwn). If the time-counting process of the stabilize timer is completed (i.e., stabilize_timer_done) and the local receiver status parameter (loc_rcvr_status) is maintained in "OK", the network device is jumped to the link up status (Link Up). Meanwhile, the link status parameter (Link_status) is switched to "OK", indicating that the network device is in the link up status (Link Up). When both of the two network devices are in the link up status (Link Up), the two network devices can transfer or receive data between each other.

In the link up status (Link Up), if the local receiver status parameter (loc_rcvr_status) is switched to "NOT_OK", a maximum wait timer is started to count. When the count value of the max wait timer reaches a configured value, a maximum wait timer done parameter (maxwait_timer_done) is switched to "true".

That is, in the link up status (Link Up), if the local receiver status parameter (loc_rcvr_status) is switched to "NOT_OK" and the maximum wait timer done parameter (maxwait_timer_done) is switched to "true", the link status parameter (Link_status) is switched to "FAIL", indicating that the network device is jumped to the link down status (Link Down). Whereas, if the count value of the maximum wait timer does not reach the configured value and the local receiver status parameter (loc_rcvr_status) is switched to "OK", the link status parameter (Link_status) is maintained in "OK", indicating the network device is maintained in the link up status (Link Up).

As shown in FIG. 1, the configured value of the master is 750 ms±10 ms, and the configured value of the slave is 350 ms±5 ms. For example, in the link up status (Link Up), if the local receiver status parameter (loc_rcvr_status) of the master has been switched to "NOT_OK" for about 750 ms, the master is switched to the link down status (Link Down). Similarly, in the link up status (Link Up), if the local receiver status parameter (loc_rcvr_status) of the slave has been switched to "NOT_OK" for about 350 ms, the slave is switched to the link down status (Link Down).

FIGS. 2A, 2B and 2C schematically illustrate some scenarios of judging the link down status of the network devices.

In the scenario of FIG. 2A, two network devices 210 and 220 are connected with each other through a network cable. The first network device 210 comprises a controller 212 and a physical layer (PHY) 214. The second network device 220 comprises a controller 222 and a physical layer (PHY) 224. After the communication between the two network devices 210 and 220, the physical layer (PHY) 214 of the first network device 210 is set as a master, and the physical layer (PHY) 224 of the second network device 220 is set as a slave.

In case that the two network devices 210 and 220 are in the link up status, the two network devices 210 and 220 can transfer or receive data (Data) between each other. For example, after the controller 222 of the second network device 220 transfers the data (Data) to the physical layer (PHY) 224, a transmitter (also referred as TX) in the physical layer (PHY) 224 of the second network device 220 transfers the data (Data) to a receiver (also referred as RX) in the physical layer (PHY) 214 of the first network device 210. Then, the physical layer (PHY) 214 of the first network device 210 transfers data to the controller 212 of the first network device 210.

In case that the network cable is plugged out or the second network device 220 is powered off, the link down status of the first network device 210 will be confirmed in a certain time. Since the physical layer (PHY) 214 of the first network device 210 is the master, the link status parameter (Link_status) is switched to "FAIL" and the link down status is confirmed after about 750 ms. On the other hand, if the physical layer (PHY) 214 of the first network device 210 is the slave, the link status parameter (Link_status) is switched to "FAIL" and the link down status is confirmed after about 350 ms.

In the scenario of FIG. 2B, three network devices 230, 240 and 250 are sequentially connected through a network cable. The first network device 230 comprises a controller 232 and a physical layer (PHY) 234. The second network device 240 comprises a controller 242 and a physical layer (PHY) 244. The third network device 250 comprises a controller 252 and a physical layer (PHY) 254. After the communication between the three network devices 230, 240 and 250, the physical layer (PHY) 234 of the first network device 230 is set as the master, the physical layer (PHY) 244 of the second network device 240 is set as the slave, and the physical layer (PHY) 254 of the second network device 250 is set as the slave.

In case that the three network devices 230, 240 and 250 are in the link up status, the three network devices 230, 240 and 250 can transfer or receive data (Data) between each other. For example, after the controller 252 of the third network device 250 transfers the data (Data) to the physical layer (PHY) 254, a transmitter (also referred as TX) in the physical layer (PHY) 254 of the third network device 250 transfers the data (Data) to a receiver (also referred as RX) in the physical layer (PHY) 244 of the second network device 240. Then, the physical layer (PHY) 244 of the second network device 240 transfers the data (Data) to the controller 242 of the second network device 242. Similarly, after the controller 242 of the second network device 240 transfers the data (Data) to the physical layer (PHY) 244, a transmitter (TX) in the physical layer (PHY) 244 of the second network device 240 transfers the data (Data) to a receiver (RX) in the physical layer (PHY) 234 of the first network device 230. Then, the physical layer (PHY) 234 of the first network device 230 transfers the data (Data) to the controller 232 of the first network device 230.

In case that the network cable between the second network device 240 and the third network device 250 is plugged out or the third network device 250 is powered off, the link down status of each of the first network device 230 and the second network device 240 will be confirmed in a certain time. Since the physical layer (PHY) 244 of the second network device 240 is the master, the link status parameter (Link_status) is switched to "FAIL" and the link down status is confirmed after about 750 ms. Since the physical layer (PHY) 234 of the first network device 230 is the slave and the first network device 230 is the farthest from the third network device 250, the link status parameter (Link_status) is switched to "FAIL" and the link down status is confirmed after about 1.1 second (i.e., 750 ms+350 ms).

In the scenario of FIG. 2C, (2N+1) network devices are connected through a network cable. For succinctness, only the network devices 310, 320, 330, 380 and 390 are shown. The network device 310, 320, 330, 380 and 390 comprises respective controllers 312, 322, 332, 382 and 392 and respective physical layers 314, 324, 334, 384 and 394. After the communication between these network devices, the physical layer (PHY) 314 of the first network device 310 is set as the master, the physical layer (PHY) 324 of the second network device 320 is set as the slave, and the physical layer (PHY) 334 of the third network device 330 is set as the slave. The rest may be deduced by analogy. Similarly, the physical layer (PHY) 384 of the 2N-th network device 380 is the master, and the physical layer (PHY) 394 of the (2N+1)-th network device 390 is the slave. In other words, after first network device 310, N masters and N salves are connected with each other in series.

In case that all of the network devices 310390 are in the link up status, these network devices 310390 can transfer or receive data (Data) between each other. For example, after the controller 392 of the (2N+1)-th network device 390 transfers a data (Data) to the physical layer (PHY) 394, a transmitter (TX) in the physical layer (PHY) 394 of the (2N+1)-th network device 390 transfers the data (Data) to a receiver (RX) in the physical layer (PHY) 384 of the N-th network device 380. Then, the physical layer (PHY) 384 of the N-th network device 380 transfers the data (Data) to the controller 382 of the N-th network device 380. Similarly, after the controller 382 of the N-th network device 380 transfers the data (Data) to the physical layer (PHY) 384, a transmitter (TX) in the physical layer (PHY) 384 of the N-th network device 380 outputs the data (Data). The rest may be deduced by analogy. After the data (Data) is transferred through the third network device 330 and the second network device 320, a receiver (RX) in the physical layer (PHY) 314 of the first network device 310 receives the data (Data). Then, the physical layer (PHY) 314 transfers the data (Data) to the controller 312 of the first network device 310.

In case that the network cable between the 2N-th network device 380 and the (2N+1)-th network device 390 is plugged out or the (2N+1)-th network device 390 is powered off, the link down status of each of the other network devices will be confirmed in a certain time. Since the first network device 310 is the farthest from the (2N+1)-th network device 390, the link status parameter (Link_status) is switched to "FAIL" and the link down status is confirmed after about (N×1.1) second (i.e., N×750 ms+N×350 ms).

As mentioned above, it is very long to detect the link down status according to the IEEE802.3 protocol of Ethernet.

SUMMARY OF THE INVENTION

An embodiment of the present invention provides a link down detector for Ethernet. The link down detector includes a high-frequency extraction component, a first power calculation component, a second power calculation component and a processing circuit. The high-frequency extraction component receives a received signal and extracts a high-frequency band signal from the received signal. The high-frequency band signal is formed as an extraction signal. The first power calculation component receives the extraction signal and calculates a power of the extraction signal. The first power calculation component issues a high-frequency band power value according to the power of the extraction signal. The second power calculation component receives the received signal and calculates a power of the received signal. The first power calculation component issues a full band power value according to the power of the received signal. The processing circuit receives the high-frequency band power value and the full band power value and calculates a ratio value of the high-frequency band power value to the full band power value. In a link up status, if the ratio value is changed dramatically in a specified time, the processing circuit asserts a link down signal to indicate that the link up status is switched to a link down status.

Another embodiment of the present invention provides a link down detecting method for Ethernet. The link down detecting method includes the following steps. Firstly, a received signal is received, and a high-frequency band signal is extracted from the received signal. Consequently, the high-frequency band signal is formed as an extraction signal. Then, a high-frequency band power value of the extraction signal is calculated, and a full band power value of the received signal is calculated. Then, a ratio value of the high-frequency band power value to the full band power value is calculated. In a link up status, if the ratio value is changed dramatically in a specified time, a link down signal is asserted to indicate that a network device connected to the Ethernet is switched to a link down status.

Another embodiment of the present invention provides a link down detector for Ethernet. The link down detector includes a high-frequency extraction component, a power calculation component and a processing circuit. The high-frequency extraction component receives a received signal and extracts a high-frequency band signal from the received signal. Consequently, the high-frequency band signal is formed as an extraction signal. The power calculation component receives the extraction signal and calculates a power of the extraction signal. The power calculation component issues a high-frequency band power value according to the power of the extraction signal. The processing circuit receives the high-frequency band power value. In a link up status, if the high-frequency band power value is changed dramatically in a specified time, the processing circuit asserts a link down signal to indicate that the link up status is switched to a link down status.

Another embodiment of the present invention provides a link down detecting method for Ethernet. The link down detecting method includes the following steps. Firstly, a received signal is received, and a high-frequency band signal is extracted from the received signal. Consequently, the high-frequency band signal is formed as an extraction signal. Then, a high-frequency band power value of the extraction signal is calculated. In a link up status, if the high-frequency band power value is changed dramatically in a specified time, a link down signal is asserted to indicate that a network device connected to the Ethernet is switched to a link down status.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIGS. 2A, 2B and 2C (prior art) schematically illustrate some scenarios of judging the link down status of the network devices;

FIG. 3A illustrates a table about the relationship between the average ratio of power distribution for the received signal and the frequency band when the network device is in a link up status;

FIG. 3B illustrates a table about the relationship between the average ratio of power distribution for the received signal and the frequency band when the network device is in a link down status;

FIG. 4A is a schematic functional block diagram illustrating the architecture of a link down detector according to a first embodiment of the present invention;

DETAILED DESCRIPTION OF PREFERRED EMBODIMENTS

Figure 1:
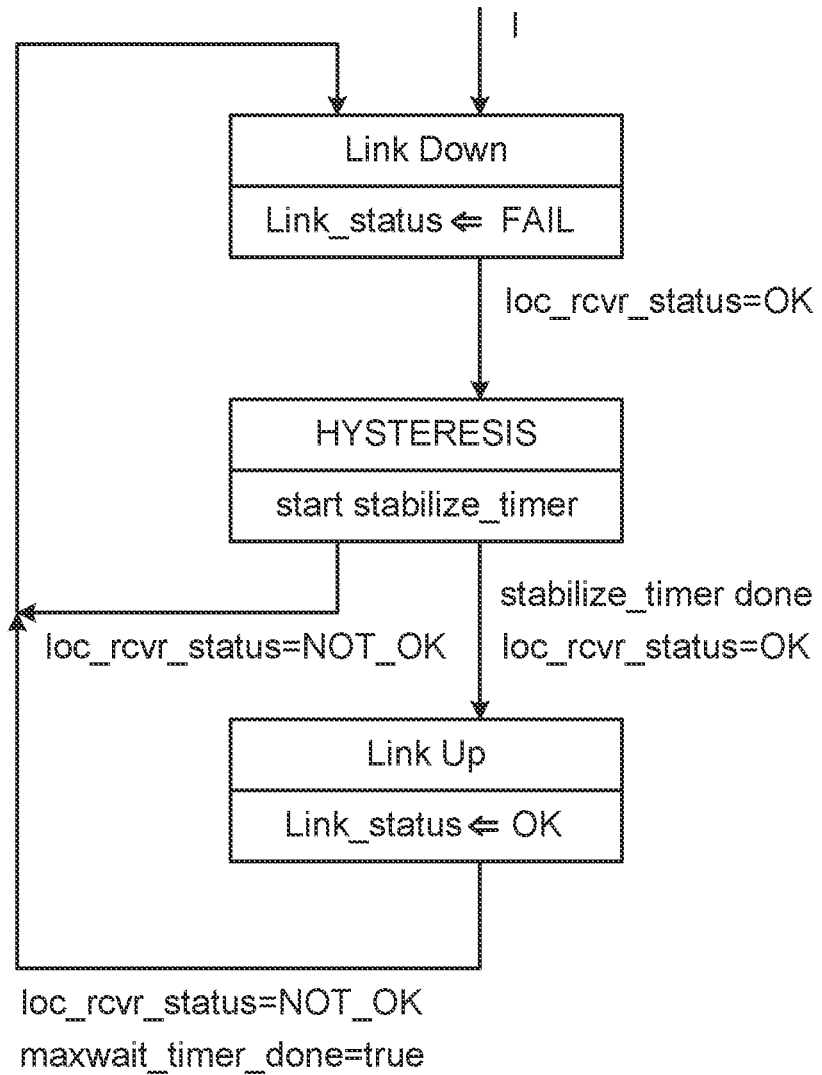
FIG. 1 (prior art) is a schematic diagram illustrating a conventional method of judging a link up status and a link down status in a physical layer.

The present invention provides a link down detector and a link down detecting method for Ethernet. The link down detector determines whether the network device enters the link down status according to the result of analyzing the quality of signals in the network cable. In accordance with the technology of the present invention, the link down detector can detect the link down status in a short time. In practice, the link down detector of the present invention can confirm the link down status within 1 ms.

When the insertion loss is taken into consideration, the power distribution in the frequency band can be inferred. Consequently, the link down detector of the present invention judges whether the network device is switched to the link down status according to the frequency domain of the signals in the network cable. In the following embodiments, two network devices are connected with each other through a 100-meter network cable, and an average ratio of power distribution for a received signal from one network device is monitored. Generally, the average ratio of power distribution for the received signal is related to the communication environment and the connected device.

FIG. 3A illustrates a table about the relationship between the average ratio of power distribution for the received signal and the frequency band when the network device is in a link up status. FIG. 3B illustrates a table about the relationship between the average ratio of power distribution for the received signal and the frequency band when the network device is in a link down status.

Please refer to FIG. 3A. When the network device is in the link up status, the average power ratio of the power of the received signal in the frequency band (0~10.4 MHz] to the power of the received signal in the full band is approximately 65.73%. Moreover, the average power ratio of the power of the received signal in the frequency band (10.4 MHz~20.8 MHz] to the power of the received signal in the full band is approximately 22.32%. Moreover, the average power ratio of the power of the received signal in the frequency band (20.8 MHz~31.25 MHz] to the power of the received signal in the full band is approximately 8.38%. Moreover, the average power ratio of the power of the received signal in the frequency band (31.25 MHz~41.6 MHz] to the power of the received signal in the full band is approximately 2.34%. Moreover, the average power ratio of the power of the received signal in the frequency band (41.6 MHz~52 MHz] to the power of the received signal in the full band is approximately 0.75%. Moreover, the average power ratio of the power of the received signal in the frequency band (52 MHz~62.5 MHz] to the power of the received signal in the full band is approximately 0.31%. The frequency band (0 MHz~62.5 MHz] may be considered as the full band. The frequency band (31.25 MHz~62.5 MHz] may be defined as a high frequency band. Consequently, in the link up status, the average power ratio of the power of the received signal in the high frequency band to the power of the received signal in the full band is approximately 3.4%, i.e., (2.34%+0.75%+0.31%)=3.4%. Of course, the definitions of the high frequency band and the full band may be varied according to the practical requirements.

Please refer to FIG. 3B. When the network device is in the link down status, the average power ratio of the power of the received signal in the frequency band (0~10.4 MHz] to the power of the received signal in the full band is approximately 64.77%. Moreover, the average power ratio of the power of the received signal in the frequency band (10.4 MHz~20.8 MHz] to the power of the received signal in the full band is approximately 24.63%. Moreover, the average power ratio of the power of the received signal in the frequency band (20.8 MHz~31.25 MHz] to the power of the received signal in the full band is approximately 7.86%. Moreover, the average power ratio of the power of the received signal in the frequency band (31.25 MHz~41.6 MHz] to the power of the received signal in the full band is approximately 1.91%. Moreover, the average power ratio of the power of the received signal in the frequency band (41.6 MHz~52 MHz] to the power of the received signal in the full band is approximately 0.61%. Moreover, the average power ratio of the power of the received signal in the frequency band (52 MHz~62.5 MHz] to the power of the received signal in the full band is approximately 0.22%. Consequently, in the link down status, the average power ratio of the power of the received signal in the high frequency band to the power of the received signal in the full band is approximately 2.74%, i.e., (1.91%+0.61%+0.22%)=2.74%.

In the link up status, the average power ratio of the power of the received signal in the high frequency band to the power of the received signal in the full band is referred as a first average power ratio ($PR_1$). In the link down status, the average power ratio of the power of the received signal in the high frequency band to the power of the received signal in the full band is referred as a second average power ratio ($PR_2$). Moreover, a variation rate may be defined according to the first average power ratio ($PR_1$) and the second average power ratio ($PR_2$). For example, the variation rate is equal to the absolute value of (the second average power ratio–the first average power ratio)/the first average power ratio. That is, variation rate=|($PR_2$-$PR_1$)/$PR_1$|. In the example of FIGS. 3A and 3B, the variation rate=|(2.74%–3.4%)/3.4%|×100%=19.41%.

In the link up status, if the variation rate of the power ratio in the high frequency band relative to the power ratio in the full band exceeds a specified variation rate, it is determined that the network device is switched from the link up status to the link down status. For example, the specified variation rate is 17%. In the link up status, if the variation rate exceeds 17%, it is determined that the network device is switched from the link up status to the link down status. It is noted that the variation rate may be varied according to the length of the network cable.

In accordance with the above technical concepts, the present invention further provides a link down detector for Ethernet. FIG. 4A is a schematic functional block diagram illustrating the architecture of a link down detector according to a first embodiment of the present invention. The link down detector 400 is installed in the network device, and the network device is connected to the network cable. Consequently, the link down detector 400 can monitor the received signal $S_R$ and assert a link down signal $S_{LD}$. In an embodiment, the received signal $S_R$ is generated by the receiver (RX) in the physical layer (PHY) of the network device. Alternatively, the link down detector 400 is directly connected with the network cable to receive the received signal $S_R$.

As shown in FIG. 4A, the link down detector 400 comprises a high-frequency extraction component 410, a first power calculation component 420, a second power calculation component 430 and a processing circuit 450.

The high-frequency extraction component 410 extracts a high-frequency band signal from the received signal $S_R$, and outputs an extraction signal $S_E$. For example, the high-frequency extraction component 410 is a band-pass filter. After the signal of the received signal $S_R$ in the frequency band 31.25 MHz~62.5 MHz is extracted by the high-frequency extraction component 410, the extraction signal S E is generated.

The first power calculation component 420 receives the extraction signal $S_E$, and calculates the power of the extraction signal $S_E$. According to the power of the extraction signal $S_E$, the first power calculation component 420 issues a high-frequency band power value $P_H$. Similarly, the second power calculation component 430 receives the received signal $S_R$, and calculates the power of the received signal $S_R$. According to the power of the received signal $S_R$, the second power calculation component 430 issues a full band power value $P_F$.

The processing circuit 450 receives the high-frequency band power value $P_H$ and the full band power value $P_F$. Then, a ratio value $R_{ato}$ of the high-frequency band power value $P_H$ to the full band power value $P_F$ is calculated by the processing circuit 450. In the link up status, if the ratio value $R_{ato}$ is changed dramatically in a short time, the processing circuit 450 judges that the network device is in the link down status.

For example, if the ratio value $R_{ato}$ is dramatically changed in a specific time (e.g., 500$n$5), the processing circuit 450 asserts the link down signal $S_{LD}$ to indicate that the network device is witched from the link up status to the link down status. Whereas, if the ratio value $R_{ato}$ is not dramatically changed in the specific time (e.g., 500 ns), the processing circuit 450 does not assert the link down signal $S_{LD}$, indicating that the network device is maintained in the link up status.

In this embodiment, the processing circuit 450 comprises a numerical processing component 452, an average value storage component 456 and a judging component 458. The numerical processing component 452 receives the high-frequency band power value $P_H$ and the full band power value $P_F$, and calculates the ratio value $R_{ato}$ of the high-frequency band power value $P_H$ to the full band power value $P_F$. In addition, the numerical processing component 452 updates the ratio value $R_{ato}$ of the high frequency band power value $P_H$ to the full band power value $P_F$ at every specific time (e.g., 500 ns).

As the ratio value $R_{ato}$ is continuously received by the average value storage component 456, an average ratio value $R_{ato\_av}$ is calculated by and stored in the average value storage component 456. The judging component 458 receives the ratio value $R_{ato}$ and the average ratio value $R_{ato\_av}$. In an embodiment, if a variation rate of the ratio value $R_{ato}$ relative to the average value $R_{ato\_av}$ exceeds a specified variation rate (e.g., 17%), it means that the ratio value $R_{ato}$ is changed dramatically in a short time. Under this circumstance, the judging component 458 asserts the link down signal $S_{LD}$ to indicate that the network device is witched from the link up status to the link down status.

For example, the numerical processing component 452 updates the ratio value $R_{ato}$ every 500 ns. If the variation rate of the ratio value $R_{ato}$ relative to the average value $R_{ato\_av}$ exceeds the specified variation rate (e.g., 17%), the judging component 458 asserts the link down signal $S_{LD}$ to indicate that the network device is witched from the link up status to the link down status.

Figure 4B:
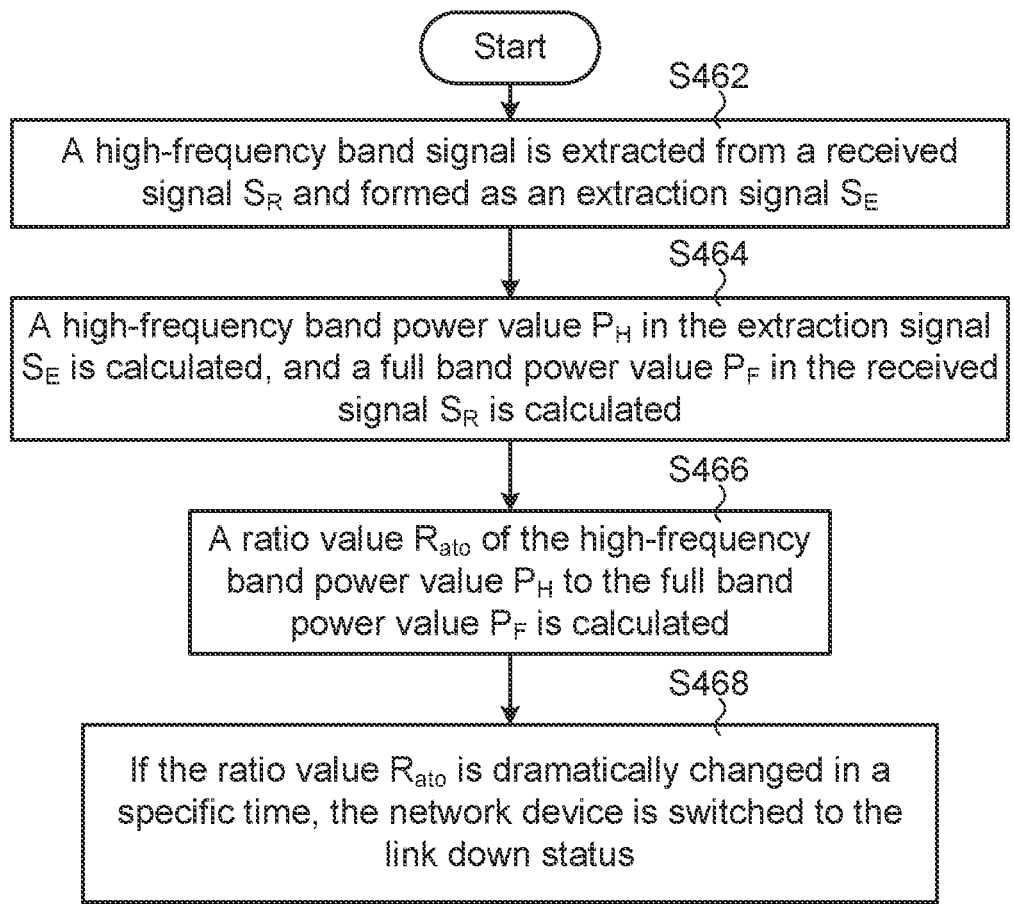
FIG. 4B is a flowchart illustrating a link down detecting method for the link down detector according to the first embodiment of the present invention.

FIG. 4B is a flowchart illustrating a link down detecting method for the link down detector according to the first embodiment of the present invention. In the link up status, the link down detecting method is started.

Firstly, in a step S462, a high-frequency band signal is extracted from a received signal $S_R$ and formed as an extraction signal $S_E$. Then, in a step S464, a high-frequency band power value P H in the extraction signal $S_E$ is calculated, and a full band power value $P_F$ in the received signal $S_R$ is calculated.

Then, in a step S466, a ratio value $R_{ato}$ of the high-frequency band power value $P_H$ to the full band power value $P_F$ is calculated. If the ratio value $R_{ato}$ is dramatically changed in a specific time, it is determined that the network device is switched to the link down status (Step S468).

In some other embodiments, the present invention provides a method of judging whether the network device is in the link down status according to the power change of the high-frequency band signal.

Figure 5:
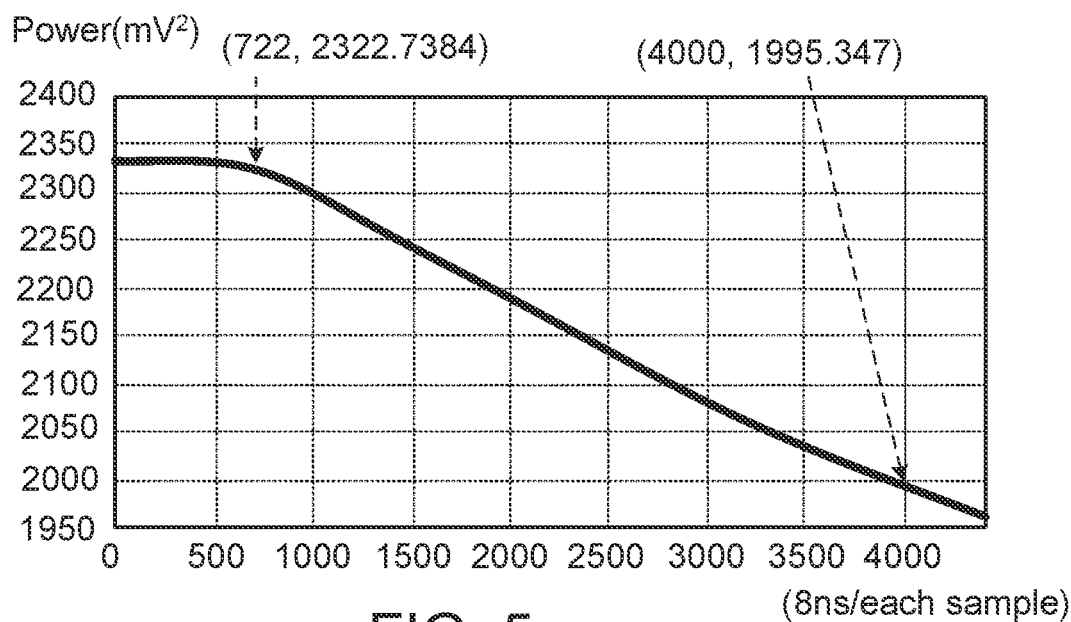
FIG. 5 is a plot illustrating the power change of the high-frequency band signal when the network device is switched from the link up status to the link down status.

FIG. 5 is a plot illustrating the power change of the high-frequency band signal when the network device is switched from the link up status to the link down status. For example, the frequency band (31.25 MHz~62.5 MHz] may be defined as a high frequency band. After the signal in the high frequency band is extracted from the received signal $S_R$, the high-frequency signal (i.e., the extraction signal $S_E$) is generated.

Moreover, the power of the high-frequency band signal in the high-frequency signal is sampled every 8 ns. Please refer to FIG. 5 again. Before the power of the high-frequency band signal has been sampled for 722 times, the network device is in the link up status and the high-frequency band power value is maintained in about 2322.7 mV$^2$.

After the power of the high-frequency band signal has been sampled for 722 times, if the network device is plugged out and the network device is switched to the link down status, the high-frequency band power value is continuously decreased. After the power of the high-frequency band signal has been sampled for 4000 times, the high-frequency band power value is decrease to about 1955.3 mV$^2$. In other words, the change of the high-frequency band power value within 26 μs (i.e., (4000–722)×8 ns) is about 14%.

Figure 6A:
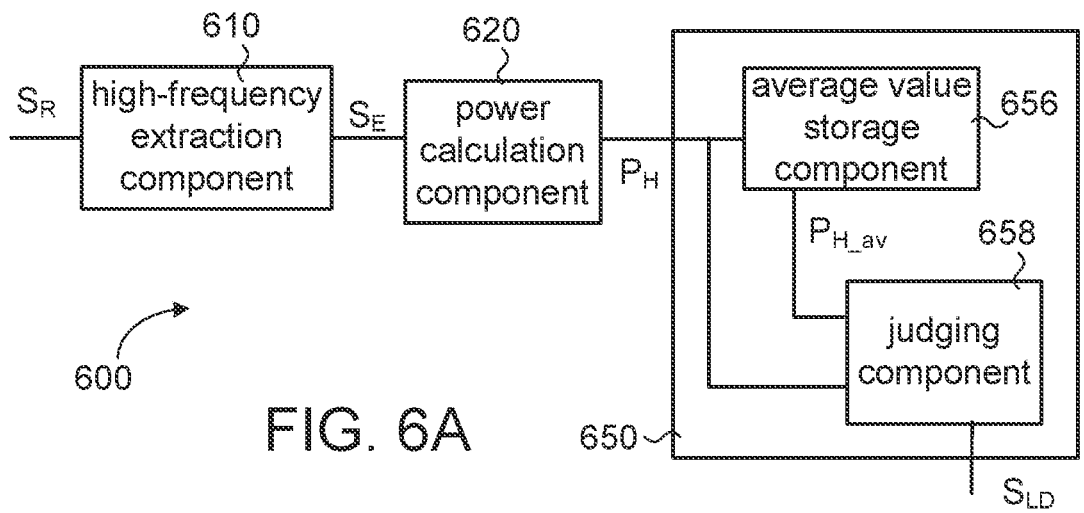
FIG. 6A is a schematic functional block diagram illustrating the architecture of a link down detector according to a second embodiment of the present invention.

In accordance with the above technical concepts, the present invention further provides a link down detector for Ethernet. FIG. 6A is a schematic functional block diagram illustrating the architecture of a link down detector according to a second embodiment of the present invention. The link down detector 600 is installed in the network device, and the network device is connected to the network cable. Consequently, the link down detector 600 can monitor the received signal $S_R$ and assert a link down signal $S_{LD}$. In an embodiment, the received signal $S_R$ is generated by the receiver (RX) in the physical layer (PHY) of the network device.

As shown in FIG. 6A, the link down detector 600 comprises a high-frequency extraction component 610, a power calculation component 620 and a processing circuit 650.

The high-frequency extraction component 610 extracts a high-frequency band signal from the received signal $S_R$, and outputs an extraction signal $S_E$. For example, the high-frequency extraction component 610 is a band-pass filter. After the signal of the received signal $S_R$ in the frequency band 31.25 MHz~62.5 MHz is extracted by the high-frequency extraction component 610, the extraction signal SE is generated.

The power calculation component 620 receives the extraction signal $S_E$, and calculates the power of the extraction signal $S_E$. According to the power of the extraction signal $S_E$, the power calculation component 620 issues a high-frequency band power value $P_H$.

The processing circuit 650 receives the high-frequency band power value $P_H$. In the link up status, if the high-frequency band power value $P_H$ is changed dramatically in a short time, the processing circuit 650 judges that the network device is in the link down status.

For example, if the high-frequency band power value $P_H$ is dramatically changed in a specific time (e.g., 500 ns), the processing circuit 650 asserts the link down signal $S_{LD}$ to indicate that the network device is witched from the link up status to the link down status. Whereas, if the high-frequency band power value $P_H$ is not dramatically changed in the specific time (e.g., 500 ns), the processing circuit 650 does not assert the link down signal $S_{LD}$, indicating that the network device is maintained in the link up status.

In this embodiment, the processing circuit 650 comprises an average value storage component 656 and a judging component 658.

As the high-frequency band power value $P_H$ is continuously received by the average value storage component 656, an average high-frequency band power value $P_{H\_av}$ is calculated by and stored in the average value storage component 656.

The judging component 658 receives the high-frequency band power value $P_H$ and the average high-frequency band power value $P_{H\_av}$. In an embodiment, if a variation rate of the high-frequency band power value $P_H$ relative to the average high-frequency band power value $P_{H\_av}$ exceeds a specified variation rate (e.g., 13%), it means that the high-frequency band power value $P_H$ is changed dramatically in a short time. Under this circumstance, the judging component 658 asserts the link down signal $S_{LD}$ to indicate that the network device is witched from the link up status to the link down status.

Figure 6B:
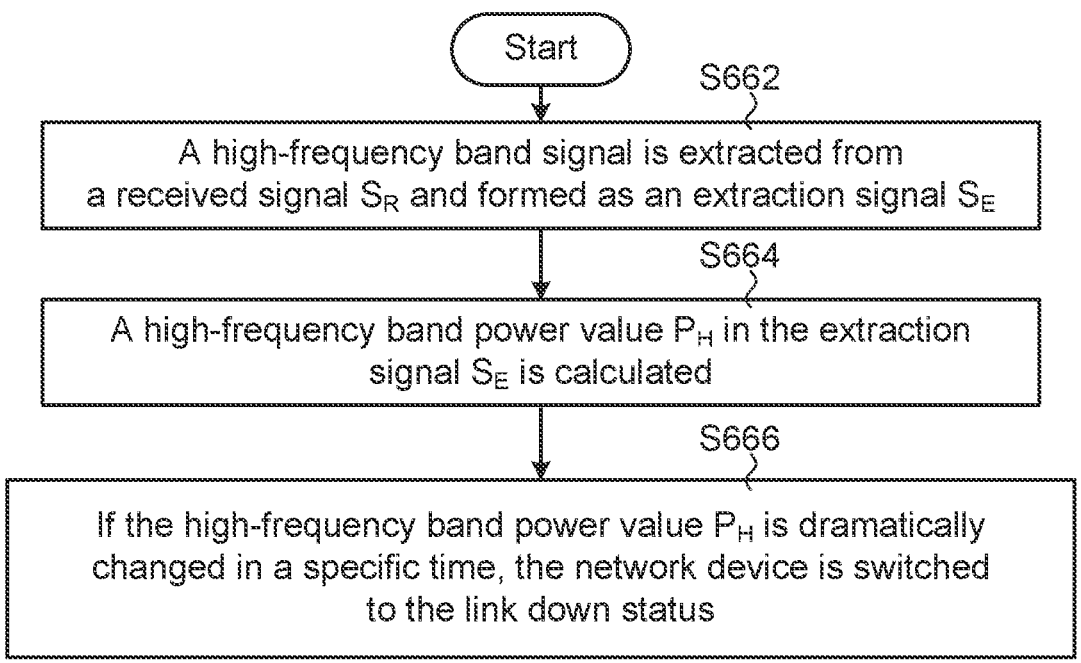
FIG. 6B is a flowchart illustrating a link down detecting method for the link down detector according to the second embodiment of the present invention.

FIG. 6B is a flowchart illustrating a link down detecting method for the link down detector according to the second embodiment of the present invention. In the link up status, the link down detecting method is started.

Firstly, in a step S662, a high-frequency band signal is extracted from the received signal $S_R$ and formed as an extraction signal $S_E$. Then, in a step S664, a high-frequency band power value $P_H$ in the extraction signal $S_E$ is calculated.

If the high-frequency band power value $P_H$ is dramatically changed in a specific time, it is determined that the network device is switched to the link down status (Step S666).

Figure 7:
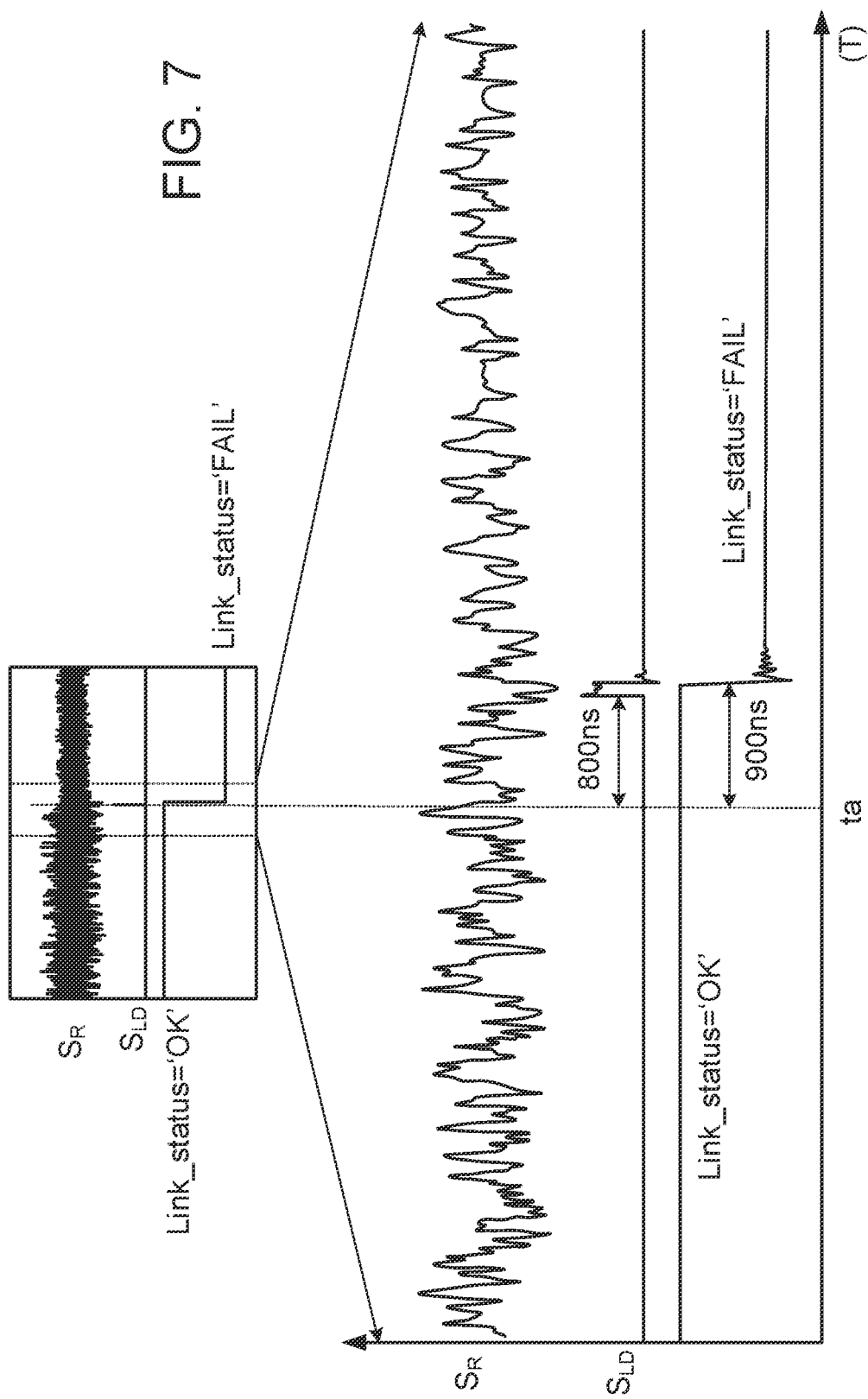
FIG. 7 is a schematic timing waveform diagram illustrating associated signals of the link down detector of the present invention when the network device is plugged out and the network device is switched from the link up status to the link down status.

FIG. 7 is a schematic timing waveform diagram illustrating associated signals of the link down detector of the present invention when the network device is plugged out and the network device is switched from the link up status to the link down status. In addition, the link status parameter (Link_status) is maintained in "OK".

At the time point ta, the network devices is plugged out. After about 800 ns, a pulse of the link down signal $S_{LD}$ is asserted. After about 100 ns, the link status parameter (Link_status) is switched in "FAIL", indicating that the network device is in the link down status.

From the above descriptions, the present invention provides a link down detector and a link down detecting method for Ethernet. The link down detector determines whether the network device enters the link down status according to the result of analyzing the quality of signals in the network cable. In accordance with the technology of the present invention, the link down detector can detect the link down status in a short time. In practice, the link down detector of the present invention can confirm the link down status within 1 ms.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A link down detector for Ethernet, the link down detector comprising:
    a high-frequency extraction component receiving a received signal, and extracting a high-frequency band signal from the received signal, so that the high-frequency band signal is formed as an extraction signal;
    a first power calculation component receiving the extraction signal, and calculating a power of the extraction signal, wherein the first power calculation component issues a high-frequency band power value according to the power of the extraction signal;
    a second power calculation component receiving the received signal, and calculating a power of the received signal, wherein the first power calculation component issues a full band power value according to the power of the received signal; and
    a processing circuit receiving the high-frequency band power value and the full band power value, and calculating a ratio value of the high-frequency band power value to the full band power value,
    wherein in a link up status, if the ratio value is changed dramatically in a specified time, the processing circuit asserts a link down signal to indicate that the link up status is switched to a link down status.

2. The link down detector as claimed in claim 1, wherein a network device is connected to a network cable, and the received signal is generated by a receiver in a physical layer of the network device.

3. The link down detector as claimed in claim 1, wherein the link down detector is connected with a network cable to receive the received signal.

4. The link down detector as claimed in claim 1, wherein the processing circuit comprises:
    a numerical processing component receiving the high-frequency band power value and the full band power value, and calculating the ratio value;
    an average value storage component continuously receiving the ratio value, wherein an average ratio value is calculated by and stored in the average value storage component; and
    a judging component receiving the ratio value and the average ratio value, wherein if a variation rate of the ratio value relative to the average value exceeds a specified variation rate, the judging component asserts the link down signal and confirms that the network device is witched from the link up status to the link down status.

5. A link down detecting method for Ethernet, the link down detecting method comprising steps of:
    receiving a received signal, and extracting a high-frequency band signal from the received signal, so that the high-frequency band signal is formed as an extraction signal;
    calculating a high-frequency band power value of the extraction signal, and calculating a full band power value of the received signal; and
    calculating a ratio value of the high-frequency band power value to the full band power value,
    wherein in a link up status, if the ratio value is changed dramatically in a specified time, a link down signal is asserted to indicate that a network device connected to the Ethernet is switched to a link down status.

6. A link down detector for Ethernet, the link down detector comprising:
    a high-frequency extraction component receiving a received signal, and extracting a high-frequency band signal from the received signal, so that the high-frequency band signal is formed as an extraction signal;
    a power calculation component receiving the extraction signal, and calculating a power of the extraction signal, wherein the power calculation component issues a high-frequency band power value according to the power of the extraction signal; and
    a processing circuit receiving the high-frequency band power value,
    wherein in a link up status, if the high-frequency band power value is changed dramatically in a specified time, the processing circuit asserts a link down signal to indicate that the link up status is switched to a link down status.

7. The link down detector as claimed in claim 6, wherein a network device is connected to a network cable, and the received signal is generated by a receiver in a physical layer of the network device.

8. The link down detector as claimed in claim 6, wherein the link down detector is connected with a network cable to receive the received signal.

9. The link down detector as claimed in claim 6, wherein the processing circuit comprises:
    an average value storage component continuously receiving the high-frequency band power value, wherein an average high-frequency band power value is calculated by and stored in the average value storage component; and
    a judging component receiving the receives the high-frequency band power value and the average high-frequency band power value, wherein if a variation rate of the high-frequency band power value relative to the average high-frequency band power value exceeds a specified variation rate, the judging component asserts the link down signal and confirms that the network device is witched from the link up status to the link down status.

10. A link down detecting method for Ethernet, the link down detecting method comprising steps of:
    receiving a received signal, and extracting a high-frequency band signal from the received signal, so that the high-frequency band signal is formed as an extraction signal; and
    calculating a high-frequency band power value of the extraction signal, wherein in a link up status, if the high-frequency band power value is changed dramatically in a specified time, a link down signal is asserted to indicate that a network device connected to the Ethernet is switched to a link down status.

* * * * *